United States Patent
Raghavan et al.

(10) Patent No.: US 11,522,581 B2
(45) Date of Patent: Dec. 6, 2022

(54) SWITCHING BETWEEN INTRA-BAND MULTIPLE INPUT MULTIPLE OUTPUT AND INTER-BAND CARRIER AGGREGATION

(71) Applicant: QUALCOMM Incorporated, San Diego, CA (US)

(72) Inventors: Vasanthan Raghavan, West Windsor Township, NJ (US); Tao Luo, San Diego, CA (US); Mohammad Ali Tassoudji, San Diego, CA (US); Yu-Chin Ou, San Diego, CA (US); Kobi Ravid, Closter, NJ (US); Ozge Koymen, Princeton, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/186,580

(22) Filed: Feb. 26, 2021

(65) Prior Publication Data

US 2021/0351816 A1    Nov. 11, 2021

Related U.S. Application Data

(60) Provisional application No. 63/021,829, filed on May 8, 2020.

(51) Int. Cl.
*H04B 7/0413* (2017.01)
*H04W 16/28* (2009.01)

(52) U.S. Cl.
CPC .......... *H04B 7/0413* (2013.01); *H04W 16/28* (2013.01)

(58) Field of Classification Search
CPC .... H04B 7/0413; H04B 7/0417; H04B 7/063; H04B 7/10; H04L 5/001; H04L 5/0023; H04W 16/28
See application file for complete search history.

(56) References Cited

U.S. PATENT DOCUMENTS

| 6,532,222 B1 * | 3/2003 | Rege ................... H04B 17/327 |
| | | 370/335 |
| 9,136,974 B2 | 9/2015 | Gorokhov et al. |

(Continued)

FOREIGN PATENT DOCUMENTS

| EP | 2088689 A1 | 8/2009 |
| WO | 2007027825 | 3/2007 |
| WO | 2020197658 | 10/2020 |

OTHER PUBLICATIONS

International Search Report and Written Opinion—PCT/US2021/020292—ISA/EPO—dated Jun. 16, 2021.

*Primary Examiner* — David B Lugo
(74) *Attorney, Agent, or Firm* — Harrity & Harrity, LLP

(57) ABSTRACT

Various aspects of the present disclosure generally relate to wireless communication. In some aspects, a user equipment (UE) may transmit, and a base station may receive, information related to multipath richness of a channel environment and information related to antenna module capabilities associated with the UE for at least a first frequency band and a second frequency band. The base station may transmit, and the UE may receive, information indicating a multiple input multiple output (MIMO) mode in which to operate one or more antenna modules of the UE based at least in part on the information related to the multipath richness of the channel environment, the antenna module capabilities associated with the UE, and respective cell loadings in the first frequency band and the second frequency band. Numerous other aspects are provided.

30 Claims, 9 Drawing Sheets

(56) References Cited

U.S. PATENT DOCUMENTS

| | | | |
|---|---|---|---|
| 2003/0043929 A1* | 3/2003 | Sampath | H04B 7/0417 375/267 |
| 2008/0317014 A1* | 12/2008 | Veselinovic | H04L 1/0001 370/380 |
| 2009/0034639 A1* | 2/2009 | Hwang | H04B 7/0689 375/260 |
| 2009/0181708 A1* | 7/2009 | Kim | H04B 7/0417 455/501 |
| 2013/0329665 A1 | 12/2013 | Kadous et al. | |
| 2013/0336242 A1 | 12/2013 | Rajagopal et al. | |
| 2015/0208421 A1* | 7/2015 | Agiwal | H04W 72/0493 455/436 |
| 2015/0318965 A1 | 11/2015 | Sawai | |
| 2016/0073287 A1* | 3/2016 | Himayat | H04W 48/18 370/236 |
| 2016/0192297 A1* | 6/2016 | Kim | H04B 7/0665 455/522 |
| 2018/0227020 A1* | 8/2018 | Ahn | H04L 25/03961 |
| 2018/0368149 A1* | 12/2018 | Raghavan | H04W 72/1231 |
| 2019/0028940 A1* | 1/2019 | Wu | H04W 36/0005 |
| 2021/0385779 A1* | 12/2021 | Oteri | H04W 60/04 |

\* cited by examiner

SWITCHING BETWEEN INTRA-BAND MULTIPLE INPUT MULTIPLE OUTPUT AND INTER-BAND CARRIER AGGREGATION

CROSS-REFERENCE TO RELATED APPLICATION

This patent application claims priority to U.S. Provisional Patent Application No. 63/021,829, filed on May 8, 2020, entitled "SWITCHING BETWEEN INTRA-BAND MULTIPLE INPUT MULTIPLE OUTPUT AND INTER-BAND CARRIER AGGREGATION," and assigned to the assignee hereof. The disclosure of the prior Application is considered part of and is incorporated by reference into this patent Application.

FIELD OF THE DISCLOSURE

Aspects of the present disclosure generally relate to wireless communication and to techniques and apparatuses for switching between intra-band multiple input multiple output (MIMO) and inter-band carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include: transmitting, to a base station, information related to multipath richness of a channel environment and information related to antenna module capabilities associated with the UE for at least a first frequency band and a second frequency band; and receiving, from the base station, information indicating a multiple input multiple output (MIMO) mode in which to operate one or more antenna modules of the UE based at least in part on the information related to the multipath richness of the channel environment, the antenna module capabilities associated with the UE, and respective cell loadings in the first frequency band and the second frequency band.

In some aspects, a method of wireless communication, performed by a base station, may include: receiving, from a UE, information related to multipath richness of a channel environment and information related to antenna module capabilities associated with the UE for at least a first frequency band and a second frequency band; and transmitting, to the UE, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band.

In some aspects, a UE for wireless communication may include a memory and one or more processors operatively coupled to the memory. The memory and the one or more processors may be configured to: transmit, to a base station, information related to multipath richness of a channel environment and information related to antenna module capabilities associated with the UE for at least a first frequency band and a second frequency band; and receive, from the base station, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band.

In some aspects, a base station for wireless communication may include a memory and one or more processors operatively coupled to the memory. The memory and the one or more processors may be configured to: receive, from a UE, information related to multipath richness of a channel environment and information related to antenna module capabilities associated with the UE for at least a first frequency band and a second frequency band; and transmit, to the UE, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band.

In some aspects, a non-transitory computer-readable medium may store one or more instructions for wireless communication. The one or more instructions, when executed by one or more processors of a UE, may cause the one or more processors to: transmit, to a base station, information related to multipath richness of a channel environment and information related to antenna module capabilities associated with the UE for at least a first frequency band and a second frequency band; and receive, from the base station, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band.

In some aspects, a non-transitory computer-readable medium may store one or more instructions for wireless communication. The one or more instructions, when executed by one or more processors of a base station, may cause the one or more processors to: receive, from a UE, information related to multipath richness of a channel environment and information related to antenna module capabilities associated with the UE for at least a first frequency band and a second frequency band; and transmit, to the UE, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band.

In some aspects, an apparatus for wireless communication may include: means for transmitting, to a base station, information related to multipath richness of a channel environment and information related to antenna module capabilities associated with the apparatus for at least a first frequency band and a second frequency band; and means for receiving, from the base station, information indicating a MIMO mode in which to operate one or more antenna modules of the apparatus based at least in part on the information related to the multipath richness of the channel environment, the antenna module capabilities associated with the apparatus, and respective cell loadings in the first frequency band and the second frequency band.

In some aspects, an apparatus for wireless communication may include: means for receiving, from a UE, information related to multipath richness of a channel environment and information related to antenna module capabilities associated with the UE for at least a first frequency band and a second frequency band; and means for transmitting, to the UE, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
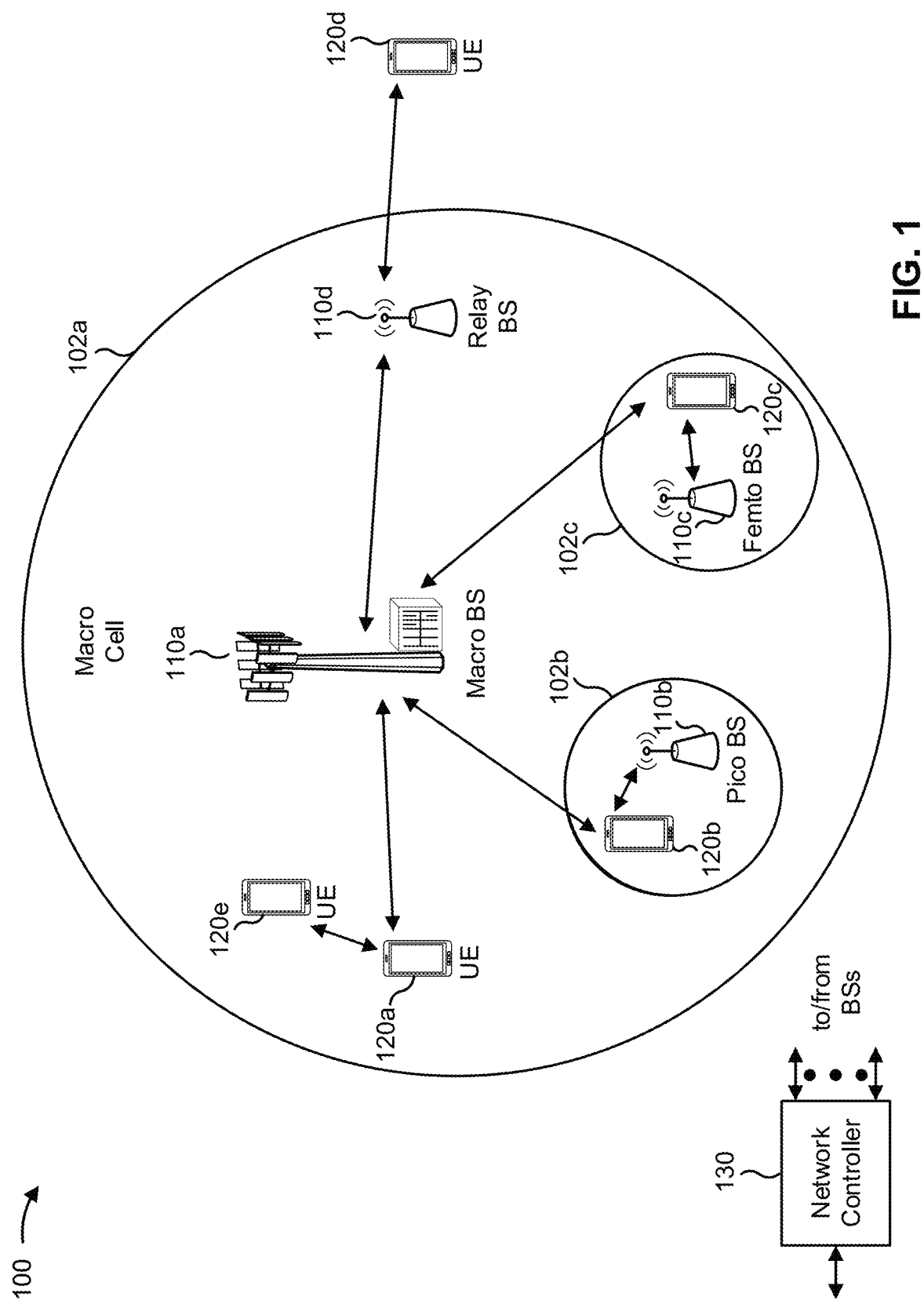
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples.

The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based at least in part on frequency or wavelength into various classes, bands, channels, and/or the like. For example, devices of wireless network 100 may communicate using an operating band having a first frequency range (FR1), which may span from 410 MHz to 7.125 GHz, may communicate using an operating band having a second frequency range (FR2), which may span from 24.25 GHz to 52.6 GHz, may communicate using an operating band having a third frequency range (FR3), which may span from 7.125 GHz to 24.25 GHz, may communicate using an operating band having a fourth frequency range (FR4), which may span from 52.6 GHz to 114.25 GHz, may communicate using an operating band having a fifth frequency range (FR5), which may include frequencies higher than 114.25 GHz (e.g., sub-terahertz), and/or the like. Note that FR3 is between FR1 and FR2, and FR4 and FR5 are above FR2. The frequencies between FR1 and FR2 (e.g., in FR3) are sometimes referred to as mid-band frequencies or a "sub-centimeter wave" band. Although a portion of FR1 is greater than 6 GHz, FR1 is often referred to as a "sub-6 GHz" band. Similarly, FR2, FR4, and/or the like are often referred to as "millimeter wave" bands despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, mid-band frequencies (e.g., greater than 7.125 GHz), and/or the like. Similarly, unless specifically stated otherwise, it should be understood that the term "millimeter wave" or the like, if used herein, may broadly represent frequencies within the EHF band, frequencies within FR2, FR4, and/or FR5, mid-band frequencies (e.g., less than 24.25 GHz), and/or the like. Furthermore, it is contemplated that the frequencies included in FR1, FR2, FR3, FR4, FR5, and/or the like may be modified, and techniques described herein are applicable to those modified frequency ranges.

As indicated above, FIG. 1 is provided as an example. Other examples may differ from what is described with regard to FIG. 1.

Figure 2:
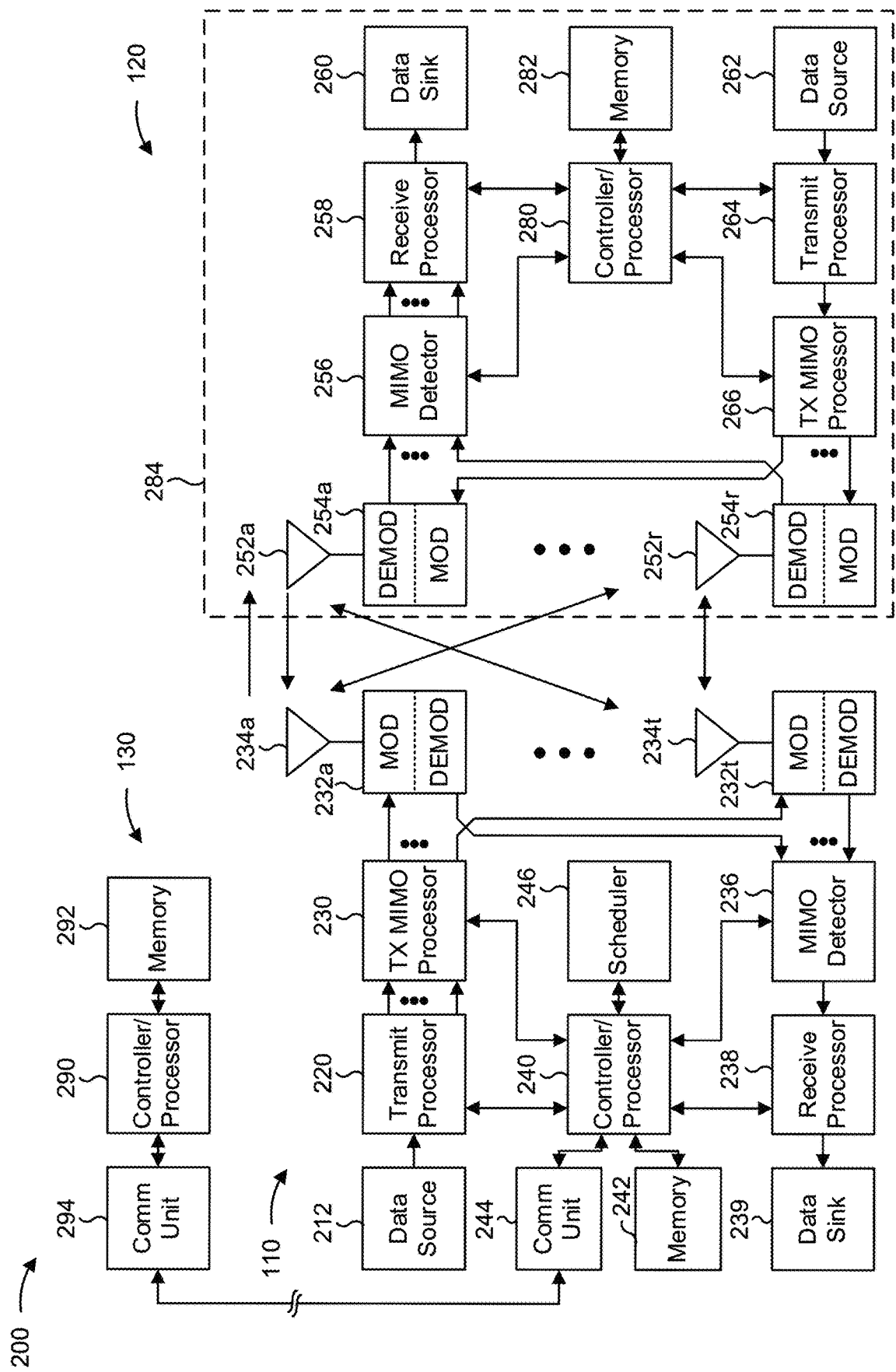
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5A-5B, FIG. 6, FIG. 7, and/or FIG. 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5A-5B, FIG. 6, FIG. 7, and/or FIG. 8).

Controller/processor 240 of base station 110, controller/processor 280 of UE 120, and/or any other component(s) of FIG. 2 may perform one or more techniques associated with switching between intra-band MIMO and inter-band carrier aggregation, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for transmitting, to base station 110, information related to multipath richness of a channel environment and information related to antenna module capabilities associated with UE 120 for at least a first frequency band and a second frequency band, means for receiving, from base station 110, information indicating a MIMO mode in which to operate one or more antenna modules of UE 120 based at least in part on the information related to the multipath richness of the channel environment, the antenna module capabilities associated with UE 120, and respective cell loadings in the first frequency band and the second frequency band, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from UE 120, information related to multipath richness of a channel environment and information related to antenna module capabilities associated with UE 120 for at least a first frequency band and a second frequency band, means for transmitting, to UE 120, information indicating a multiple input multiple output mode in which to operate one or more antenna modules of UE 120 based at least in part on the information related to the multipath richness of the channel environment, the antenna module capabilities associated with UE 120, and respective cell loadings in the first frequency band and the second frequency band, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
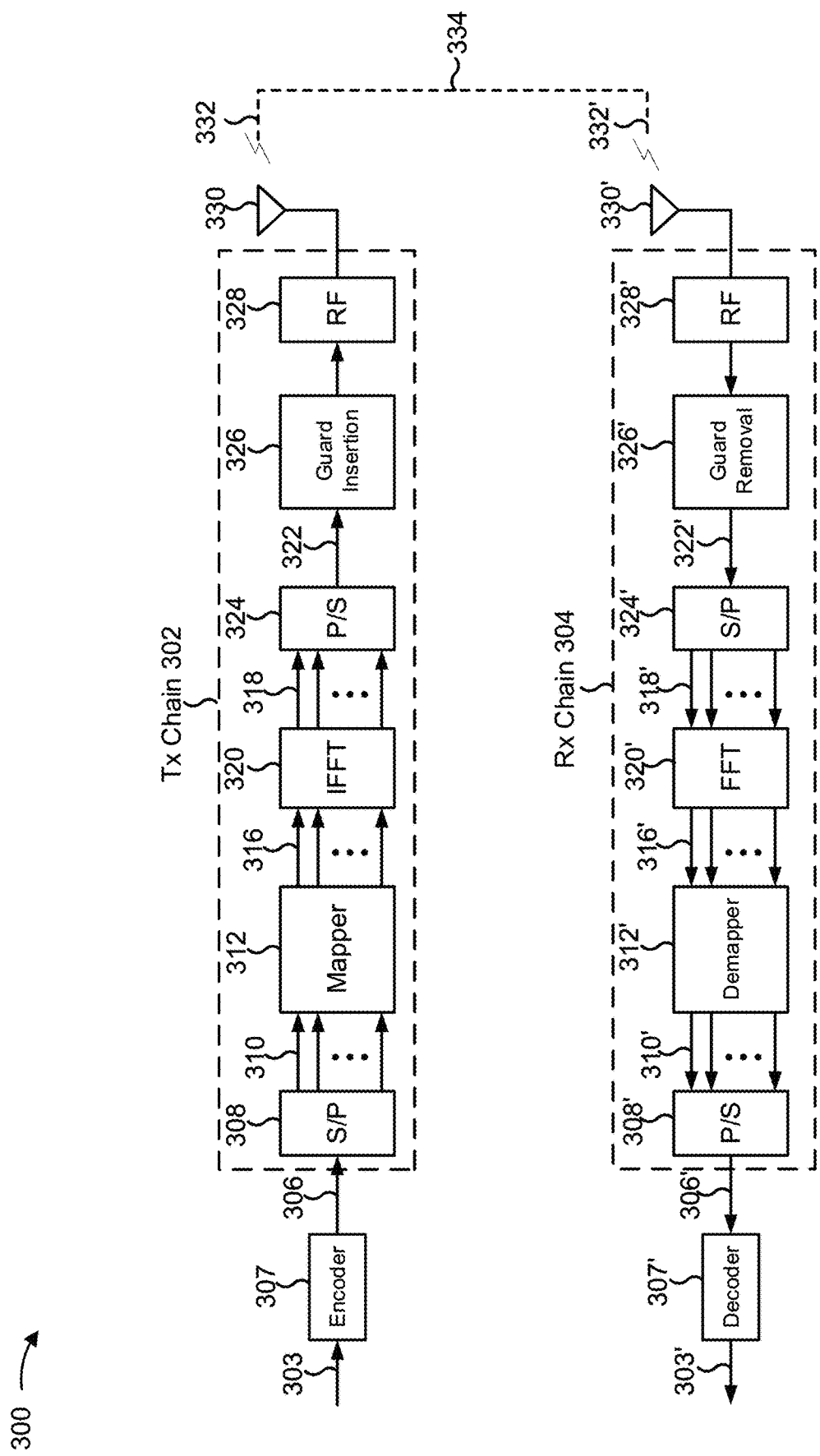
FIG. 3 is a diagram illustrating an example of a transmit chain and a receive chain of a UE, in accordance with the present disclosure.

FIG. 3 is a diagram illustrating an example 300 of a transmit (Tx) chain 302 and a receive (Rx) chain 304 of a UE 120, in accordance with the present disclosure. In some aspects, one or more components of Tx chain 302 may be implemented in transmit processor 264, TX MIMO processor 266, MOD/DEMOD 254, controller/processor 280, and/or the like, as described above in connection with FIG. 2. In some aspects, Tx chain 302 may be implemented in UE 120 for transmitting data 306 (e.g., uplink data, an uplink reference signal, uplink control information, and/or the like) to base station 110 on an uplink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which correspond to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, MOD/DEMOD 254, controller/processor 280, and/or the like, as described above in connection with FIG. 2. In some aspects, Rx chain 304 may be implemented in UE 120 for receiving data 306 (e.g., downlink data, a downlink reference signal, downlink control information, and/or the like) from base station 110 on a downlink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
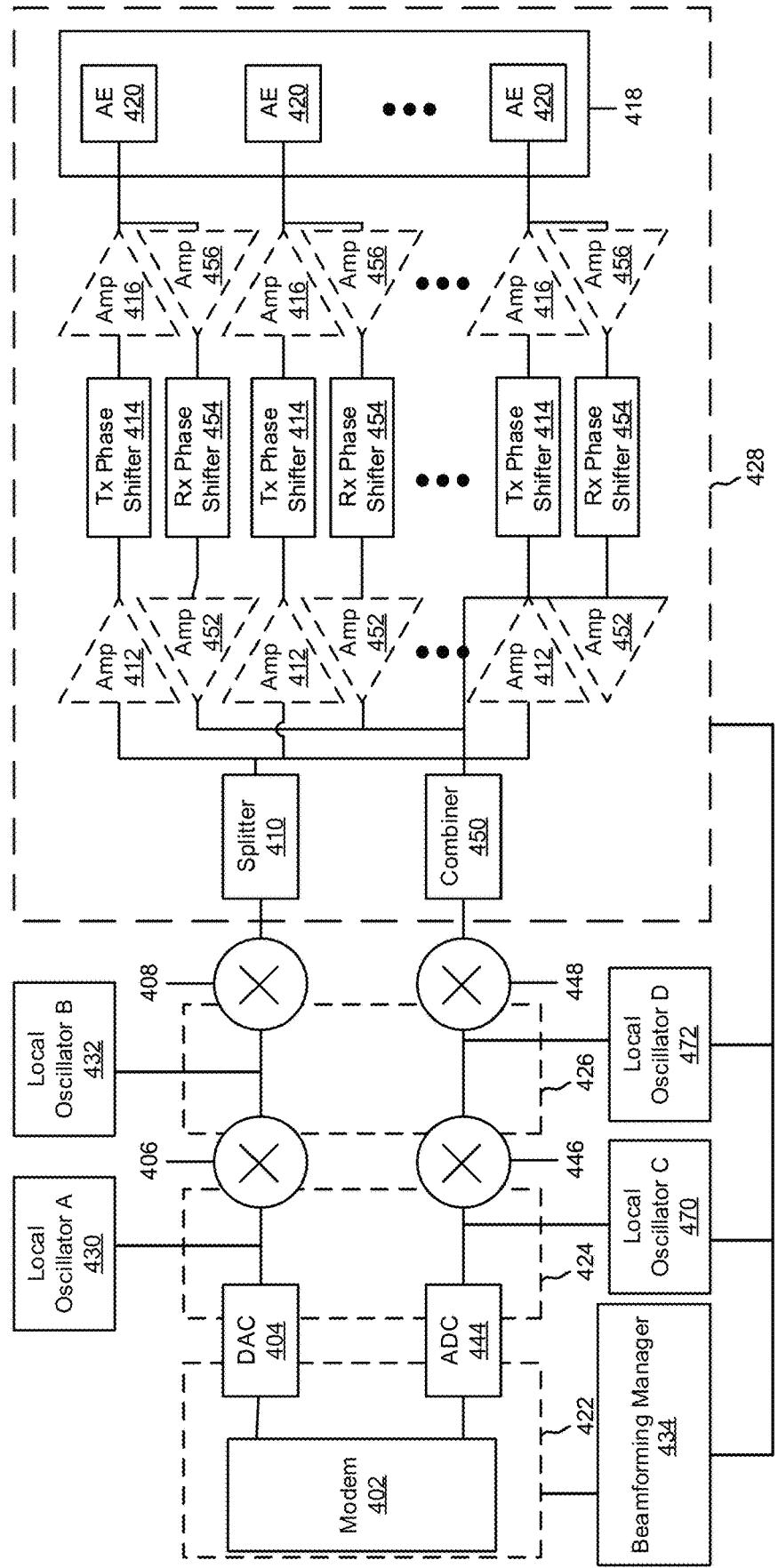
FIG. 4 is a diagram illustrating an example beamforming architecture that supports beamforming for millimeter wave (mmW) communications, in accordance with the present disclosure.

FIG. 4 is a diagram illustrating an example beamforming architecture 400 that supports beamforming for millimeter wave (mmW) communications, in accordance with the present disclosure. In some aspects, architecture 400 may implement aspects of wireless network 100. In some aspects, architecture 400 may be implemented in a transmitting device (e.g., a first wireless communication device, UE, or base station) and/or a receiving device (e.g., a second wireless communication device, UE, or base station), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420.

Transmission lines or other waveguides, wires, traces, and/or the like are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog radio frequency (RF) signals travel or are processed. The architecture also includes a local oscillator A 430, a local oscillator B 432, and a beamforming manager 434.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two-dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the beamforming manager 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the beamforming manager 434) to provide independent control of the gain for each antenna element 420. For example, the modem 402 and/or the beamforming manager 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the beamforming manager 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the beamforming manager 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to analog signals. The analog signals output from ADC 444 is input to modem 402 for baseband processing, such as decoding, de-interleaving, and/or the like.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the beamforming manager 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The beamforming manager 434 may be located partially or fully within one or more other components of the architecture 400. For example, the beamforming manager 434 may be located within the modem 402 in some aspects.

As indicated above, FIG. 4 is provided as an example. Other examples may differ from what is described with regard to FIG. 4.

Figure 5A:
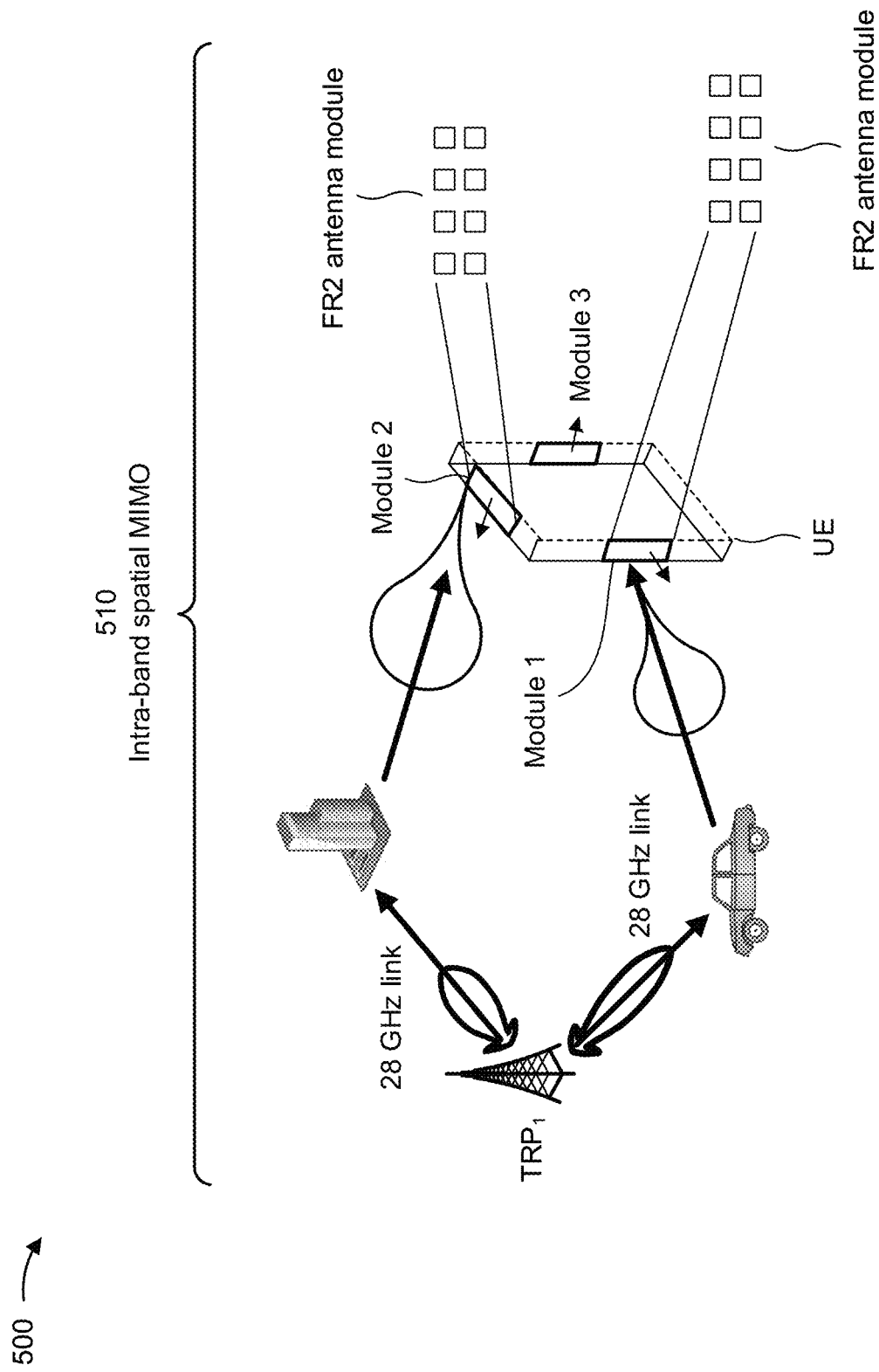
FIGS. 5A-5B are diagrams illustrating examples of intra-band spatial multiple input multiple output (MIMO) and inter-band carrier aggregation, in accordance with the present disclosure.
Figure 5B:
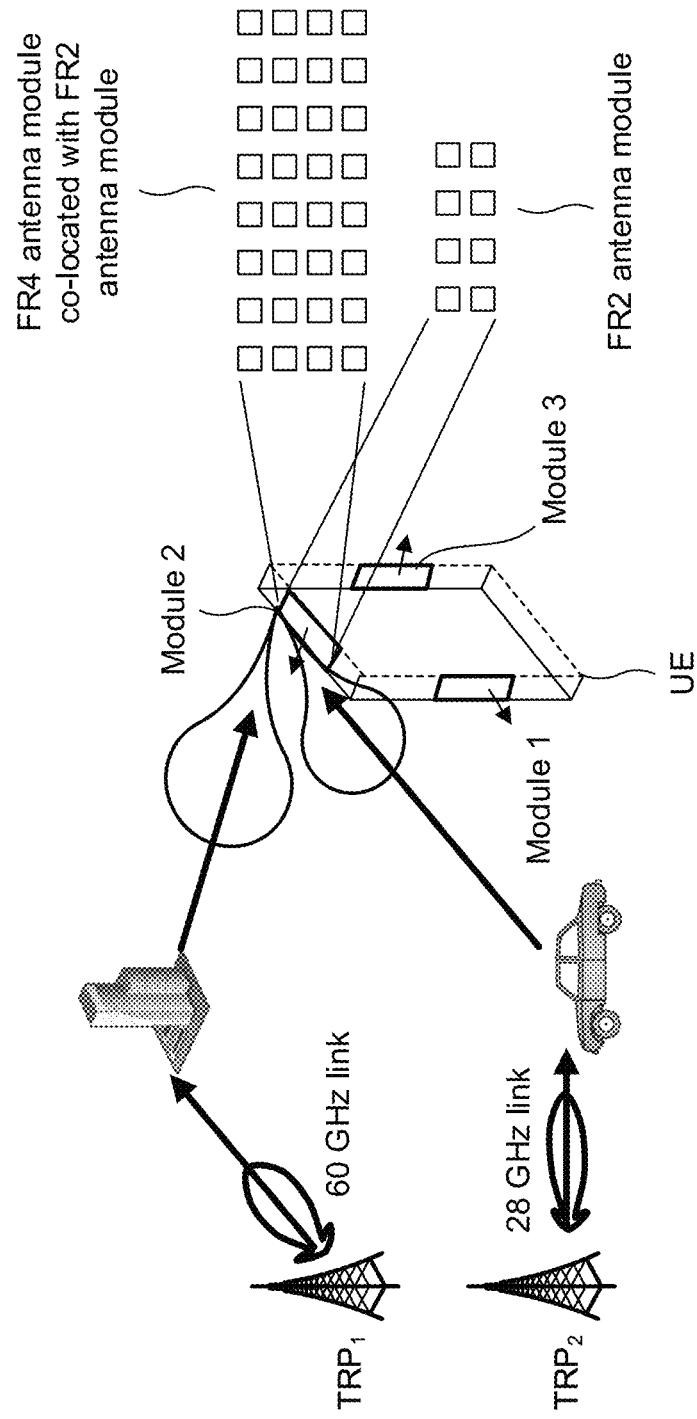

FIGS. 5A-5B are diagrams illustrating examples 500 of intra-band spatial MIMO and inter-band carrier aggregation, in accordance with the present disclosure. For example, some radio access technologies (RATs), such as 5G-NR, may operate in the millimeter wave (mmWave or mmW) spectrum. For example, mmW communications may be performed in Frequency Range 2 (FR2), which includes frequency bands from 24.25 GHz to 52.6 GHz, in Frequency Range 4 (FR4), which includes frequency bands from 52.6 GHz to 114.25 GHz, and/or the like, as compared to Frequency Range 1 (FR1), which includes sub-6 GHz frequency bands and may operate in a range of approximately 450 MHz to 7.125 GHz. In general, mmW communications in FR2, FR4, and/or the like may be associated with higher data rates than FR1, which generally requires multiple radio frequency (RF) chains and complex antenna array/subarray structures. For example, a UE configured to communicate in mmW frequency bands may have an RF chain configuration with two receive chains and two transmit chains (2Rx/2Tx), four receive chains and two transmit chains (4Rx/2Tx), four receive chains and four transmit chains (4Rx/4Tx), eight receive chains and eight transmit chains (8Rx/8Tx), and/or the like.

Accordingly, for a UE with multiple RF chains, the RF chains can be operated in an intra-band spatial MIMO mode to transmit and/or receive mmW signals (e.g., at 28 GHz or another frequency) over different clusters in a wireless channel, in an inter-band carrier aggregation mode to transmit and/or receive mmW signals (e.g., at 28 GHz and 38 GHz, at 28 GHz and 60 GHz, and/or the like) over the same or different clusters in the wireless channel, an intra-band polarization MIMO mode, and/or the like. For example, because mmW communications have a higher frequency and a shorter wavelength than various other radio waves used for communications (e.g., sub-6 GHz communications), mmW communications may have shorter propagation distances, may be subject to atmospheric attenuation, may be more easily blocked by obstructions than other types of radio waves, and/or the like. Accordingly, to improve radio performance, mitigate path loss, and/or the like, mmW communications may be performed using beamforming, in which a transmitting wireless communication device may generate a transmit beam, and a receiving wireless communication device may generate a corresponding receive beam. The transmit beam may be reflected, diffracted, scattered, and/or the like by one or more clusters, obstacles, materials, and/or the like within an environment between or around the transmitting and receiving devices. For example, as used herein, the term "cluster" may generally refer to objects in the channel environment through which energy propagates. Example clusters in mmW channel environments may include reflectors such as lamp posts, vehicles, glass/window panes, metallic objects, and/or the like, diffractors such as edges or corners of buildings, walls, and/or the like, and/or scattering via irregular objects such as walls, human bodies, and/or the like.

In cases where a UE has two RF chains, the two RF chains may be operated in a polarization MIMO mode, where H-pole and V-pole antenna modules (e.g., antenna arrays with multiple antenna elements) are connected by an RF chain. For example, the H-pole antenna module may receive a signal from a base station, which is also dual polarized, and the H-pole and V-pole antenna modules may each point in a similar direction such that a data rate may be essentially doubled due to the dual polarization. However, as an antenna configuration of a UE is implemented with a higher rank or a higher number of RF chains (e.g., four or more RF chains), there may be various tradeoffs among different modes designed to gainfully utilize the higher number of RF chains. For example, in some cases, multiple RF chains may be implemented within a single antenna module. Additionally, or alternatively, multiple RF chains may be implemented in different antenna modules at different locations in the UE to improve coverage, reduce cost, distribute heat to address thermal constraints, and/or the like. For example, FIGS. 5A and 5B illustrate an example UE that includes three antenna modules (shown as Module 1, Module 2, and Module 3) covering two long edges of the UE and one of the short edges of the UE. However, it will be appreciated that the antenna modules may be arranged in various other ways.

As shown in FIG. 5A, and by reference number 510, the multiple antenna modules of the UE may be operated in an intra-band spatial MIMO mode to transmit and/or receive mmW signals over different clusters in a wireless channel. For example, in an intra-band spatial MIMO mode, a single base station (e.g., shown as $TRP_1$) operating at a particular frequency (e.g., 28 GHz) may transmit multiple beams toward different clusters in the wireless environment (e.g., a car roof and a building that act as reflectors), and the UE may generate beams from different antenna modules to receive the multiple beams. For example, the base station may transmit two layers toward each cluster (e.g., using polarization MIMO), and the UE may be able to decode the four layers using two different antenna modules. Accordingly, in the intra-band spatial MIMO mode, polarization MIMO techniques may be used with a higher rank in order to transmit and/or receive signals in a single frequency band using different antenna modules to form beams that are pointing in different directions.

Additionally, or alternatively, as shown in FIG. 5B, and by reference number 520, the multiple antenna modules of the UE may be operated in an inter-band carrier aggregation mode to transmit and/or receive mmW signals over the same cluster or over different clusters in a wireless channel. For example, in some aspects, the UE may include a multi-band antenna module (e.g., Module 2) with a first antenna module that can transmit and/or receive mmW signals in a first frequency band (e.g., an FR2 frequency band, such as 28 GHz) and a second co-located antenna module that can transmit and/or receive mmW signals in a second frequency band (e.g., an FR4 frequency band, such as 60 GHz). In an intra-module inter-band carrier aggregation mode, the UE may generate two beams (e.g., using polarization MIMO) from the same antenna module to transmit and/or receive signals in different frequency bands. Similarly, in an inter-module inter-band carrier aggregation mode, the UE may generate two beams from different antenna modules to transmit and/or receive signals in different frequency bands (e.g., different component carriers). Accordingly, the UE may generally support the inter-band carrier aggregation mode in cases where the UE has at least one multi-band antenna module, which may include a wideband antenna array that can operate at different frequency bands (e.g., 28 GHz and 60 GHz).

In some aspects, the intra-band spatial MIMO mode (e.g., as shown in FIG. 5A) and the inter-band carrier aggregation mode (e.g., as shown in FIG. 5B) may each be associated with respective advantages and tradeoffs. For example, in mmW frequencies, a wireless link at a higher carrier frequency is typically associated with worse performance than a wireless link at a lower carrier frequency due to increased free space path loss, worse reflectivity, and increased penetration loss of clusters (e.g., a cluster such as a glass window, a metallic object such as the roof of a car, and/or the like that acts as a reflector at the lower carrier frequency may also act as a reflector at the higher carrier frequency, but loss due to the reflectivity phenomenon may be greater at the higher carrier frequency). In other words, loss may generally increase as the carrier frequency increases (e.g., depending on the material, permittivity, reflectivity, reflectance, and/or other properties of the cluster). On the other hand, a higher carrier frequency can generally offer a better antenna gain for a multi-band antenna module. For example, because a physical separation between antenna elements needs to be the same for each band in a multi-band antenna module, a distance physically separating the antenna elements is typically determined by the higher carrier frequency, resulting in better antenna gain at the higher carrier frequency. Accordingly, whether the intra-band spatial MIMO mode or the inter-band carrier aggregation mode offers better performance may depend on which factor(s) (e.g., free space path loss, reflectivity and penetration loss of clusters, antenna gain, and/or the like) are dominant in the wireless environment for different frequency bands, carrier frequencies, and/or the like.

However, existing wireless networks lack a mechanism to provide a UE or a base station (or a TRP and/or the like) with visibility into the various conditions that may indicate which factor(s) are dominant in the wireless environment for different frequency bands, carrier frequencies, and/or the like. As a result, UEs and base stations may be unable to determine the optimal MIMO mode (e.g., intra-band spatial MIMO or inter-band carrier aggregation) in which to operate one or more antenna modules of the UE, which may lead to suboptimal data rates, poor network load balancing and/or utilization across spectrum allocated to a wireless network, and/or the like. Accordingly, some aspects described herein relate to techniques and apparatuses to determine a preferred mode in which to operate one or more antenna modules of a UE based at least in part on one or more measurements that relate to multipath richness of a wireless channel for different frequency bands, antenna module capabilities of the UE for the different frequency bands, respective cell loadings in the different frequency bands, and/or the like. In this way, a UE and/or a base station may determine a preferred mode in which to operate one or more antenna modules of the UE according to the multipath richness of a wireless channel, the antenna module capabilities of the UE, respective cell loadings, and/or other suitable parameters that relate to conditions in different frequency bands. In this way, the UE and the base station may coordinate the mode in which the UE is to operate the antenna module(s) of the UE in order to balance tradeoffs among the different modes supported by the UE, improve performance (e.g., data rates and/or reliability) for the UE, improve spectrum usage and/or load balancing, and/or the like.

As indicated above, FIGS. 5A-5B are provided as an example. Other examples may differ from what is described with respect to FIGS. 5A-5B.

Figure 6:
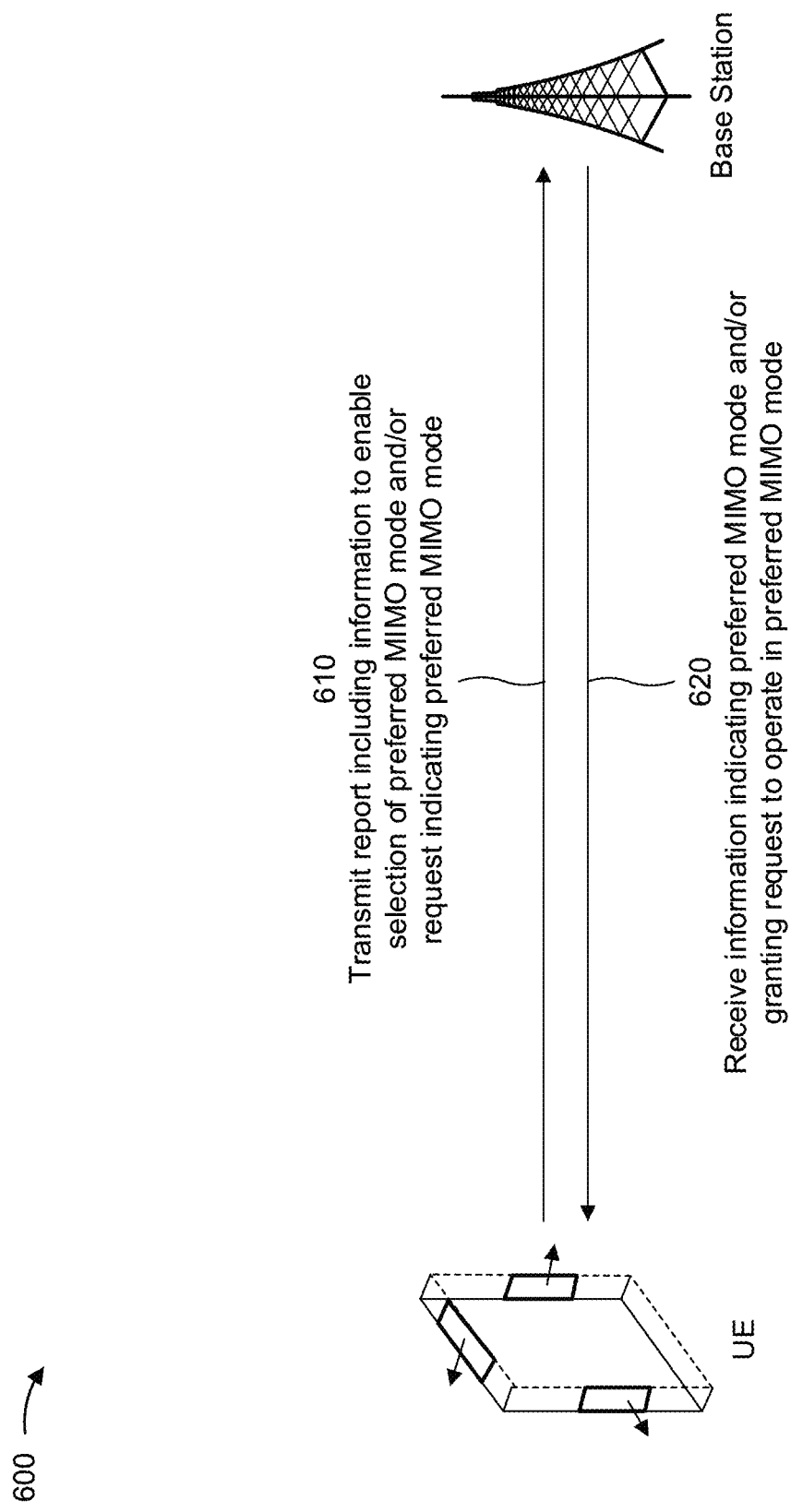
FIG. 6 is a diagram illustrating an example of switching between intra-band MIMO and inter-band carrier aggregation, in accordance with the present disclosure.

FIG. 6 is a diagram illustrating an example 600 of switching between intra-band MIMO and inter-band carrier aggregation, in accordance with the present disclosure. As shown in FIG. 6, example 600 includes a UE (e.g., UE 120 and/or the like) in communication with a base station (e.g., base station 110 and/or the like) in a wireless network (e.g., wireless network 100 and/or the like). Furthermore, as described herein, the UE may generally include an antenna configuration with one or more antenna modules that support operation in different MIMO modes. For example, in some aspects, the different MIMO modes supported by the UE may include an intra-band spatial MIMO mode (e.g., as shown in FIG. 5A), an intra-module inter-band carrier aggregation mode (e.g., as shown in FIG. 5B), an inter-module inter-band carrier aggregation mode, and/or the like. Accordingly, as described herein, the UE and/or the base station may determine a preferred mode in which to operate the one or more antenna modules of the UE based at least in part on information related to conditions of a wireless environment, capabilities of the antenna module(s) of the UE, conditions of a wireless network, advantages and/or tradeoffs associated with different MIMO modes supported by the antenna module(s) of the UE, and/or the like.

For example, as described above, whether an intra-band spatial MIMO mode or an inter-band carrier aggregation mode offers better performance (e.g., from a perspective of the UE) may generally depend on factors such as free space path loss, reflectivity and penetration loss of clusters, antenna gain, and/or the like for different frequency bands, carrier frequencies, and/or the like.

Furthermore, the intra-band spatial MIMO mode may be associated with a constraint that restricts RF chains to inter-module usage due to a need to down-convert RF signals to the same intermediate frequency (IF), whereas intra-module usage may be easier to implement in inter-band carrier aggregation because RF-to-IF down-conversion does not pose a major constraint in inter-band carrier aggregation. For example, to support two (or more) frequency bands within a single antenna module, the antenna module may include two RF chains for each respective frequency band (e.g., two RF chains at 28 GHz and two RF chains at 60 GHz to support intra-module operation at 28 GHz and 60 GHz). This may be enabled by superheterodyne techniques to demodulate an incoming signal from an RF to an IF and then from the IF to a baseband. Accordingly, because the IF may generally differ across different frequency bands, separating the IF components associated with different signals within the same antenna module to avoid mutual interference may be easier when the RF chains are associated with different frequency bands (e.g., as in inter-band carrier aggregations). Accordingly, the intra-band spatial MIMO mode may be restricted to inter-module usage, which may lead to greater power consumption because multiple antenna modules are simultaneously operating. On the other hand, the intra-module inter-band carrier aggregation mode may consume less power, but simultaneously operating the single antenna module at different frequency bands may lead to thermal issues. As a result, the intra-module inter-band carrier aggregation mode may consume less power than the intra-band spatial MIMO mode, but the intra-band spatial MIMO mode may distribute heat across more RF integrated circuits and therefore offer better thermal performance.

In some aspects, another factor that may affect whether the intra-band spatial MIMO mode or the inter-band carrier aggregation mode offers better performance may relate to multipath richness of a wireless channel environment for different frequency bands. For example, the intra-band spatial MIMO mode may be associated with better (e.g., faster) rates at a lower band than inter-band carrier aggregation in cases where the wireless channel environment is associated with a richer channel (e.g., more clusters), which may enable inter-module usage of different clusters that satisfy a performance threshold (e.g., a reference signal received power (RSRP) threshold). On the other hand, the inter-band carrier aggregation mode may offer better rates when there is a sparser channel (e.g., a smaller number of clusters that satisfy the performance threshold), because the intra-band spatial MIMO mode may be forced to point a beam towards a weak cluster within the wireless channel environment (e.g., one or more antenna modules may be associated with poor data rates).

Accordingly, in wireless environments where there is a sparse channel with a small number of clusters (e.g., one or two clusters, as may often be the case in an urban micro environment, a rural macro environment, and/or the like), the inter-band carrier aggregation mode may offer better rates than the intra-band spatial MIMO mode. However, in wireless environments where there is a rich channel with a large number of clusters (e.g., more than two clusters, as may be the case in an indoor office environment, an indoor shopping mall environment, a stadium environment, and/or the like), the intra-band spatial MIMO mode may offer better rates than the inter-band carrier aggregation mode. However, in cases where the UE has antenna module capabilities that enable selection of a dominant cluster in the wireless channel with different antenna modules (e.g., a large number of antenna modules, diversity of directions that are scannable with each antenna module, and/or the like), the spatial MIMO mode may also offer better rates than the inter-band carrier aggregation mode even if the wireless channel has a small number of clusters. Accordingly, as described herein, whether the intra-band spatial MIMO mode or the inter-band carrier aggregation mode offers better performance may depend on factors such as multipath richness (or sparseness) of a wireless channel in different frequency bands (e.g., a number of clusters that satisfy a performance threshold), antenna module capabilities of the UE, and/or the like.

Furthermore, in some aspects, another factor that may affect whether the intra-band spatial MIMO mode or the inter-band carrier aggregation mode offers better performance may relate to respective loads associated with different frequency bands. For example, a wireless network may be allocated different portions of spectrum (e.g., licensed spectrum), whereby inter-band carrier aggregation may offer better performance from a network perspective by enabling load balancing across spectrum that may be allocated to the wireless network. Furthermore, load balancing across different frequency bands may improve overall spectrum utilization, whereas intra-band spatial MIMO may result in one or more frequency bands being underutilized or not being utilized. Further still, load balancing across different frequency bands (e.g., as in inter-band carrier aggregation) may provide the base station with flexibility to share spectrum across cell-center and cell-edge UEs. Accordingly, as described herein, whether the intra-band spatial MIMO mode or the inter-band carrier aggregation mode offers better performance may depend on factors such as respective loads in different frequency bands, whether the UE is a cell-center or cell-edge UE, and/or the like.

As shown in FIG. 6, and by reference number 610, the UE may transmit, and the base station may receive, a report that includes information to enable the base station to select a preferred MIMO mode for the UE. Additionally, or alternatively, as further shown by reference number 610, the UE may transmit, and the base station may receive, a request to operate one or more antenna modules of the UE in a preferred MIMO mode selected by the UE. For example, in some aspects, the selection of the preferred MIMO mode may be performed by the UE and/or the base station according to information that relates to multipath richness of a channel environment for different frequency bands, antenna module capabilities of the UE for different frequency bands, respective cell loadings in different frequency bands, a coarse location of the UE within a cell provided by the base station (e.g., cell-edge or cell-center), and/or the like.

Accordingly, in some aspects, the UE may obtain one or more measurements to quantify information related to multipath richness (or sparseness) of a wireless channel for different frequency bands. For example, during a beam training process, the base station may transmit a set of synchronization signal block (SSB) beams, channel state information reference signal (CSI-RS) beams, and/or the like for different frequency bands in respective beam sweeps over a coverage area associated with the base station. The UE may determine a quantity of SSB or CSI-RS beams that satisfy a reference signal received power (RSRP) threshold for each frequency band (e.g., band-specific RSRP thresholds configured by the base station), and the respective quantities of SSB or CSI-RS beams that satisfy the RSRP threshold may provide a measure of the multipath richness (or sparseness) of the channel environment for the different frequency bands in terms of a number of good clusters that are observed at the UE for each frequency band. In this way, the UE and/or the base station may select a preferred MIMO mode based at least in part on the number of good clusters in each frequency band (e.g., the number of SSB or CSI-RS beams in each frequency band that satisfy the RSRP threshold). For example, as described above, the intra-band spatial MIMO mode may generally offer better rates at a lower frequency band in cases where there is a richer channel with a large number of clusters allowing inter-module usage of multiple good clusters, whereas inter-band carrier aggregation may offer better rates when there is a sparse channel with a small number of clusters.

Furthermore, in some aspects, the UE may select the preferred MIMO mode according to antenna module capabilities of the UE and/or report information related to the antenna module capabilities to the base station to enable the base station to select the preferred MIMO mode. For example, as described above, the intra-band spatial MIMO mode may offer better rates than the inter-band carrier aggregation mode in scenarios where the wireless channel is sparse (e.g., has a small number of clusters) and the UE has antenna module capabilities that allow for the ability to select a dominant cluster in a particular frequency band with different antenna modules. In other examples, as described above, the intra-band spatial MIMO mode and the inter-band carrier aggregation mode may have various tradeoffs and advantages with respect to power consumption, thermal or heat distribution, complexity due to RF-to-IF down-conversion, and/or the like. Accordingly, in some aspects, the antenna module capabilities that the UE considers when selecting the preferred MIMO mode and/or reporting information to enable the base station to select the preferred MIMO mode may include a number of antenna modules that the UE has, an antenna configuration or type of antenna elements included in the respective antenna modules, an array size for the respective antenna modules, an array geometry and/or inter-antenna element spacings of the antenna module(s), whether the UE is restricted to supporting an inter-module spatial MIMO mode or supports an intra-module spatial MIMO mode, and/or the like. Additionally, or alternatively, when reporting the antenna module capabilities to the base station, the UE may indicate a category to coarsely quantize the antenna module capabilities of the UE that are available in different frequency bands (e.g., high capability, moderate capability, low capability, and/or the like) such that the base station can determine the appropriate MIMO mode for the UE.

Furthermore, in some aspects, the UE and/or the base station may select the preferred MIMO mode according to respective cell loadings in the different frequency bands. For example, in some aspects, the base station may broadcast or otherwise advertise information related to respective cell loadings in each frequency band to enable the UE to select the preferred MIMO mode. Additionally, or alternatively, the UE may determine the respective cell loadings in each frequency band based at least in part on statistics or historical data related to long-term grants that are requested by the UE and satisfied by the base station in the different frequency bands. For example, if a proportion of long-term grants that are requested by the UE is higher in a first frequency band than a second frequency band, the UE may determine that the first frequency band has a lighter load than the second frequency band. Furthermore, in cases where the UE detects clusters, paths, multipath components, and/or the like that are excited by transmissions from multiple base stations, TRPs, and/or the like in one or more frequency bands, the UE may self-identify as a cell-edge UE in the information reported to the base station in order to request a MIMO mode that offers better rates and/or reliability.

Accordingly, in some aspects, the UE may select a preferred MIMO mode (e.g., intra-module inter-band carrier aggregation, inter-module inter-band carrier aggregation, intra-module spatial MIMO, inter-module spatial MIMO, and/or the like) based at least in part on information related to the multipath richness of the channel environment for different frequency bands (e.g., the number of good clusters in each frequency band, as determined according to a number of SSB or CSI-RS beams that satisfy an RSRP threshold), antenna module capabilities of the UE for the different frequency bands, respective cell loadings in the different frequency bands, and/or the like. In such cases, the UE may transmit a request to the base station to indicate the preferred MIMO mode selected by the UE. Additionally, or alternatively, in some aspects, the UE may report information related to the multipath richness of the channel environment for different frequency bands and the antenna module capabilities of the UE for the different frequency bands to enable the base station to select the preferred MIMO mode based at least in part on the multipath richness of the channel environment for the different frequency bands, the antenna module capabilities of the UE for the different frequency bands, and network-level data related to respective cell loadings in the different frequency bands.

In some aspects, the information transmitted from the UE to the base station may be carried in a channel state feedback (CSF) reports, uplink control information (UCI) of a physical uplink control channel (PUCCH), and/or the like. Additionally, or alternatively, because the preferred MIMO mode may be used for relatively slower time-scale adaptation (e.g., over ten slots, one hundred slots, and/or the like, since the wireless channel conditions may not be expected to change instantaneously within a slot), the information reported to the base station may be carried in UE-assisted information via radio resource control (RRC) signaling.

As further shown in FIG. 6, and by reference number 620, the base station may transmit, and the UE may receive, information indicating the preferred MIMO mode in which to operate the one or more antenna modules of the UE or information granting the UE's request to operate in the preferred MIMO mode selected by the UE. For example, as described above, the UE may transmit information including a measure of the multipath richness of the wireless channel environment in terms of a number of good clusters observed by the UE in different frequency bands and information related to the antenna module capabilities of the UE in different frequency bands to enable the base station to select the preferred MIMO mode, which may then be indicated to the UE. Additionally, or alternatively, the UE may request to operate in a preferred MIMO mode that is selected by the UE according to the various factors described in further detail above, and the base station may either grant the request or indicate that the UE is to operate in a different MIMO mode (e.g., the base station may override a request of the UE to operate in the intra-band spatial MIMO mode in order to balance a load across spectrum using inter-band carrier aggregation). Accordingly, the UE may operate the one or more antenna modules according to the MIMO mode indicated by the base station, and the UE and the base station may continue to communicate according to the coordinated MIMO mode. For example, in some aspects, intra-band spatial MIMO and inter-band carrier aggregation may be associated with different signaling protocols, whereby the UE and the base station may need to coordinate the MIMO mode in which the UE is operating at a given time. Furthermore, in this way, the UE and the base station may cooperatively determine the preferred MIMO mode to optimize performance for the UE and the network based at least in part on various advantages and tradeoffs associated with the different MIMO modes supported by the UE.

As indicated above, FIG. 6 is provided as an example. Other examples may differ from what is described with respect to FIG. 6.

Figure 7:
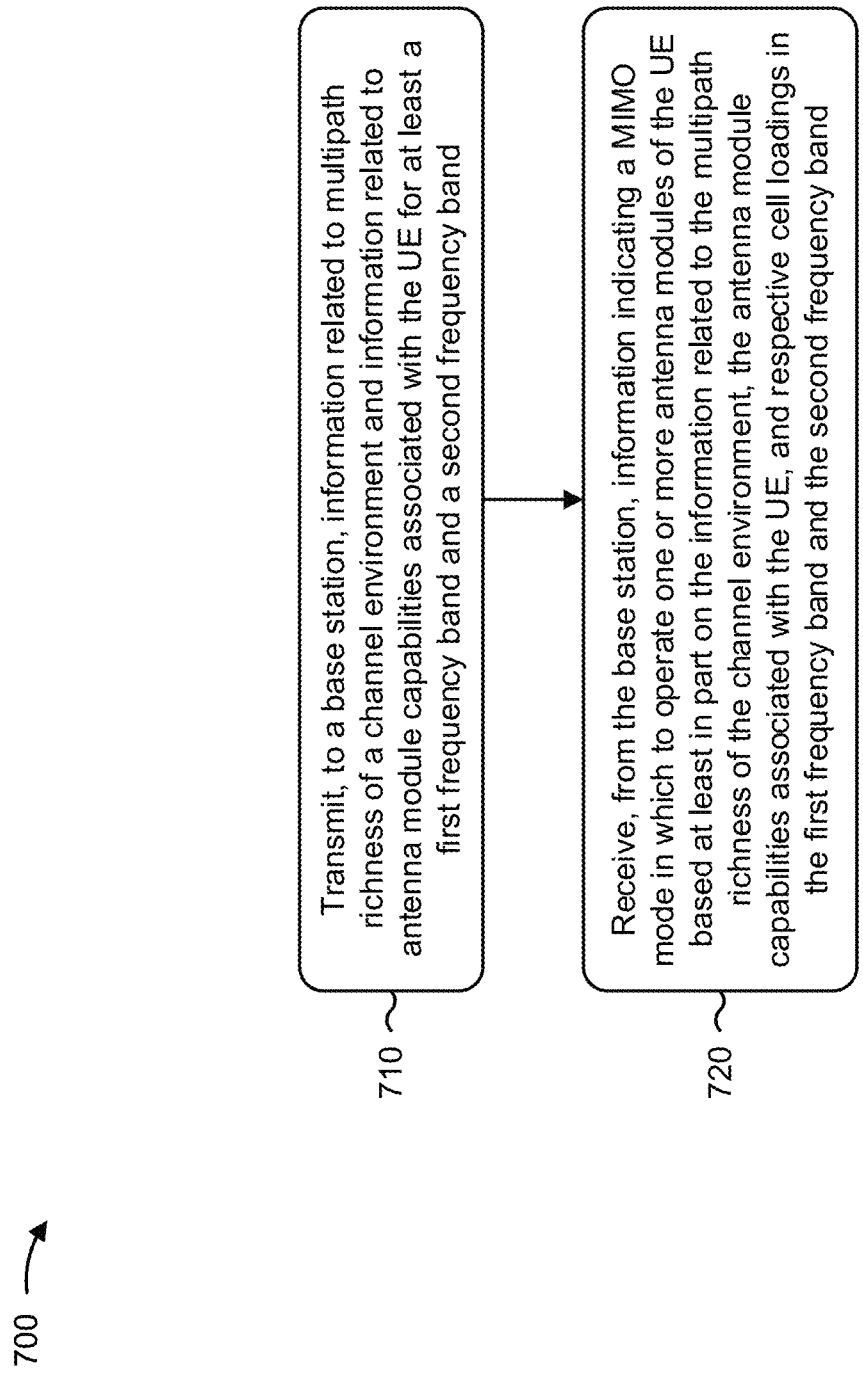
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with switching between intra-band MIMO and inter-band carrier aggregation.

As shown in FIG. 7, in some aspects, process 700 may include transmitting, to a base station, information related to multipath richness of a channel environment and information related to antenna module capabilities associated with the UE for at least a first frequency band and a second frequency band (block 710). For example, the UE may transmit (e.g., using controller/processor 280, transmit processor 264, TX MIMO processor 266, MOD 254, antenna 252, memory 282, Tx chain 302, architecture 400, and/or the like), to a base station, information related to multipath richness of a channel environment and information related to antenna module capabilities associated with the UE for at least a first frequency band and a second frequency band, as described above.

As further shown in FIG. 7, in some aspects, process 700 may include receiving, from the base station, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band (block 720). For example, the UE may receive (e.g., using antenna 252, DEMOD 254, MIMO detector 256, receive processor 258, controller/processor 280, memory 282, Rx chain 304, architecture 400, and/or the like), from the base station, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band, as described above.

Process 700 may include additional aspects, such as any single aspect or any combination of aspects described below and/or in connection with one or more other processes described elsewhere herein.

In a first aspect, the MIMO mode is an intra-band spatial MIMO mode, an inter-band carrier aggregation mode, or an intra-band polarization MIMO mode.

In a second aspect, alone or in combination with the first aspect, the information related to the multipath richness of the channel environment indicates a first number of clusters, paths, or multipath components that satisfy a first RSRP threshold in the first frequency band and a second number of clusters, paths, or multipath components that satisfy a second RSRP threshold in the second frequency band.

In a third aspect, alone or in combination with one or more of the first and second aspects, the first number of clusters, paths, or multipath components and the second number of clusters, paths, or multipath components are determined based at least in part on SSB beams or CSI-RS beams transmitted by the base station during a beam training process.

In a fourth aspect, alone or in combination with one or more of the first through third aspects, the information related to the antenna module capabilities associated with the UE indicates a number of the one or more antenna modules of the UE, an antenna configuration or type of one or more antenna elements included in the one or more antenna modules of the UE, an array size for the one or more antenna modules of the UE, an array geometry or inter-antenna element spacings of the one or more antenna modules of the UE, and/or the like.

In a fifth aspect, alone or in combination with one or more of the first through fourth aspects, process 700 includes determining a preferred mode in which to operate the one or more antenna modules based at least in part on the information related to the multipath richness of the channel environment and the antenna module capabilities associated with the UE, and transmitting, to the base station, a request to operate the one or more antenna modules in the preferred mode, where the MIMO mode indicated by the base station is further based at least in part on the preferred mode requested by the UE.

In a sixth aspect, alone or in combination with one or more of the first through fifth aspects, process 700 includes receiving, from the base station, information indicating the respective cell loadings in the first frequency band and the second frequency band, where the preferred mode in which to operate the one or more antenna modules is further based at least in part on the respective cell loadings in the first frequency band and the second frequency band.

In a seventh aspect, alone or in combination with one or more of the first through sixth aspects, process 700 includes determining the respective cell loadings in the first frequency band and the second frequency band based at least in part on historical data related to long-term grants that are requested by the UE and satisfied by the base station in the first frequency band and the second frequency band, where the preferred mode in which to operate the one or more antenna modules is further based at least in part on the respective cell loadings in the first frequency band and the second frequency band.

In an eighth aspect, alone or in combination with one or more of the first through seventh aspects, process 700 includes transmitting, to the base station, information identifying the UE as a cell-edge UE based at least in part on detecting clusters, paths, or multipath components excited by transmissions from multiple base stations or TRPs, wherein the preferred mode requested by the UE and/or the MIMO mode indicated by the base station is further based at least in part on whether the UE is identified as a cell-edge UE.

In a ninth aspect, alone or in combination with one or more of the first through eighth aspects, information enabling the base station to determine the MIMO mode in which to operate the one or more antenna modules is transmitted in a CSF report.

In a tenth aspect, alone or in combination with one or more of the first through ninth aspects, information enabling the base station to determine the MIMO mode in which to operate the one or more antenna modules is transmitted in UCI of a PUCCH.

In an eleventh aspect, alone or in combination with one or more of the first through tenth aspects, one or more of information enabling the base station to determine the MIMO mode or the information indicating the MIMO mode is transmitted via RRC signaling.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
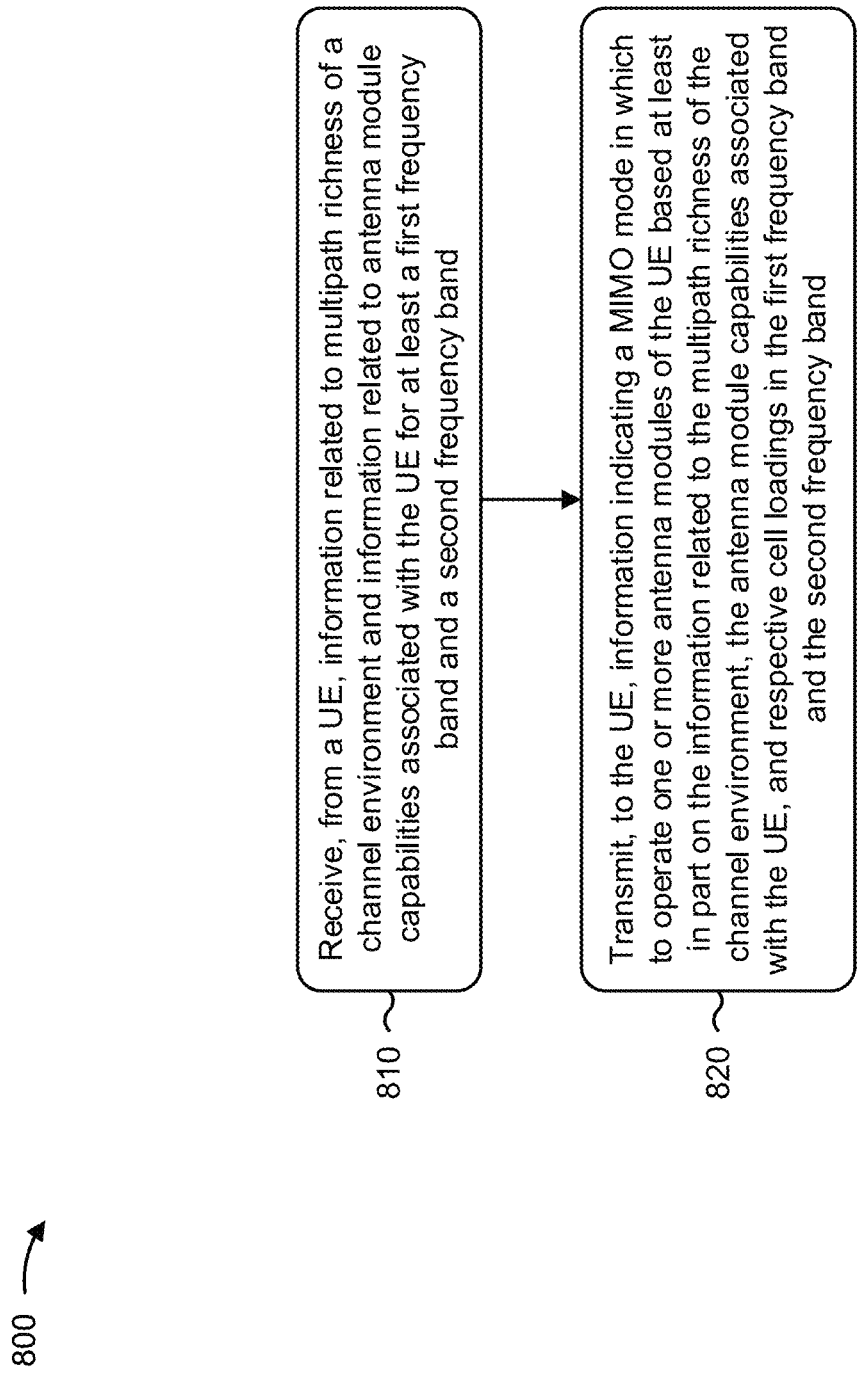
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 and/or the like) performs operations associated with switching between intra-band spatial and inter-band carrier aggregation.

As shown in FIG. 8, in some aspects, process 800 may include receiving, from a UE, information related to multipath richness of a channel environment and information related to antenna module capabilities associated with the UE for at least a first frequency band and a second frequency band (block 810). For example, the base station may receive (e.g., using antenna 234, DEMOD 232, MIMO detector 236, receive processor 238, controller/processor 240, memory 242, and/or the like), from a UE, information related to multipath richness of a channel environment and information related to antenna module capabilities associated with the UE for at least a first frequency band and a second frequency band, as described above.

As further shown in FIG. 8, in some aspects, process 800 may include transmitting, to the UE, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band (block 820). For example, the base station may transmit (e.g., using controller/processor 240, transmit processor 220, TX MIMO processor 230, MOD 232, antenna 234, memory 242, and/or the like), to the UE, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band, as described above.

Process 800 may include additional aspects, such as any single aspect or any combination of aspects described below and/or in connection with one or more other processes described elsewhere herein.

In a first aspect, the MIMO mode is an intra-band spatial MIMO mode, an inter-band carrier aggregation mode, or an intra-band polarization MIMO mode.

In a second aspect, alone or in combination with the first aspect, the information related to the multipath richness of the channel environment indicates a first number of clusters, paths, or multipath components that satisfy a first RSRP threshold in the first frequency band and a second number of clusters, paths, or multipath components that satisfy a second RSRP threshold in the second frequency band.

In a third aspect, alone or in combination with one or more of the first and second aspects, the first number of clusters, paths, or multipath components and the second number of clusters, paths, or multipath components are determined by the UE based at least in part on SSB beams or CSI-RS beams transmitted by the base station during a beam training process.

In a fourth aspect, alone or in combination with one or more of the first through third aspects, the information related to the antenna module capabilities associated with the UE indicates a number of the one or more antenna modules of the UE, an antenna configuration or type of one or more antenna elements included in the one or more antenna modules of the UE, an array size for the one or more antenna modules of the UE, an array geometry or inter-antenna element spacings of the one or more antenna modules of the UE, and/or the like.

In a fifth aspect, alone or in combination with one or more of the first through fourth aspects, process 800 includes receiving, from the UE, a request to operate the one or more antenna modules in a preferred mode that is determined by the UE based at least in part on the information related to the multipath richness of the channel environment and the antenna module capabilities associated with the UE, where the MIMO mode is determined by the base station further based at least in part on the preferred mode requested by the UE.

In a sixth aspect, alone or in combination with one or more of the first through fifth aspects, the preferred mode requested by the UE is further based at least in part on the respective cell loadings in the first frequency band and the second frequency band.

In a seventh aspect, alone or in combination with one or more of the first through sixth aspects, process 800 includes broadcasting information indicating the respective cell loadings in the first frequency band and the second frequency band.

In an eighth aspect, alone or in combination with one or more of the first through seventh aspects, process 800 includes receiving, from the UE, information identifying the UE as a cell-edge UE based at least in part on the UE detecting clusters, paths, or multipath components excited by transmissions from multiple base stations or transmit receive points, where the preferred mode requested by the UE and/or the MIMO mode indicated by the base station is further based at least in part on whether the UE is identified as a cell-edge UE.

In a ninth aspect, alone or in combination with one or more of the first through eighth aspects, information enabling the base station to determine the MIMO mode in which to operate the one or more antenna modules is received in a CSF report transmitted by the UE.

In a tenth aspect, alone or in combination with one or more of the first through ninth aspects, information enabling the base station to determine the MIMO mode in which to operate the one or more antenna modules is received in UCI of a PUCCH transmitted by the UE.

In an eleventh aspect, alone or in combination with one or more of the first through tenth aspects, one or more of information enabling the base station to determine the MIMO mode or the information indicating the MIMO mode is transmitted via RRC signaling.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a UE, comprising: transmitting, to a base station, information related to multipath richness of a channel environment and information related to antenna module capabilities associated with the UE for at least a first frequency band and a second frequency band; and receiving, from the base station, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band.

Aspect 2: The method of Aspect 1, wherein the MIMO mode is an intra-band spatial MIMO mode, an inter-band carrier aggregation mode, or an intra-band polarization MIMO mode.

Aspect 3: The method of any of Aspects 1-2, wherein the information related to the multipath richness of the channel environment indicates a first number of clusters, paths, or multipath components that satisfy a first RSRP threshold in the first frequency band and a second number of clusters, paths, or multipath components that satisfy a second RSRP threshold in the second frequency band.

Aspect 4: The method of Aspect 3, wherein the first number of clusters, paths, or multipath components and the second number of clusters, paths, or multipath components are determined based at least in part on SSB beams or CSI-RS beams transmitted by the base station during a beam training process.

Aspect 5: The method of any of Aspects 1-4, wherein the information related to the antenna module capabilities associated with the UE indicates one or more of a number of the one or more antenna modules of the UE, an antenna configuration or type of one or more antenna elements included in the one or more antenna modules of the UE, an array size for the one or more antenna modules of the UE, or an array geometry or inter-antenna element spacings of the one or more antenna modules of the UE.

Aspect 6: The method of any of Aspects 1-5, further comprising: determining a preferred mode in which to operate the one or more antenna modules based at least in part on the information related to the multipath richness of the channel environment and the antenna module capabilities associated with the UE; and transmitting, to the base station, a request to operate the one or more antenna modules in the preferred mode, wherein the MIMO mode indicated by the base station is further based at least in part on the preferred mode requested by the UE.

Aspect 7: The method of Aspect 6, further comprising: receiving, from the base station, information indicating the respective cell loadings in the first frequency band and the second frequency band, wherein the preferred mode in which to operate the one or more antenna modules is further based at least in part on the respective cell loadings in the first frequency band and the second frequency band.

Aspect 8: The method of Aspect 6, further comprising: determining the respective cell loadings in the first frequency band and the second frequency band based at least in part on historical data related to long-term grants that are requested by the UE and satisfied by the base station in the first frequency band and the second frequency band, wherein the preferred mode in which to operate the one or more antenna modules is further based at least in part on the respective cell loadings in the first frequency band and the second frequency band.

Aspect 9: The method of any of Aspects 6-8, further comprising: transmitting, to the base station, information identifying the UE as a cell-edge UE based at least in part on detecting clusters, paths, or multipath components excited by transmissions from multiple base stations or transmit receive points, wherein one or more of the preferred mode requested by the UE or the MIMO mode indicated by the base station is further based at least in part on whether the UE is identified as a cell-edge UE.

Aspect 10: The method of any of Aspects 1-9, wherein information enabling the base station to determine the MIMO mode in which to operate the one or more antenna modules is transmitted in a CSF report.

Aspect 11: The method of any of Aspects 1-10, wherein information enabling the base station to determine the MIMO mode in which to operate the one or more antenna modules is transmitted in UCI of a PUCCH.

Aspect 12: The method of any of Aspects 1-11, wherein one or more of information enabling the base station to determine the MIMO mode or the information indicating the MIMO mode is transmitted via RRC signaling.

Aspect 13: A method of wireless communication performed by a base station, comprising: receiving, from a UE, information related to multipath richness of a channel environment and information related to antenna module capabilities associated with the UE for at least a first frequency band and a second frequency band; and transmitting, to the UE, information indicating a MIMO mode in which to operate one or more antenna modules of the UE based at least in part on the information related to the multipath richness of the channel environment, the antenna module capabilities associated with the UE, and respective cell loadings in the first frequency band and the second frequency band.

Aspect 14: The method of Aspect 13, wherein the MIMO mode is an intra-band spatial MIMO mode, an inter-band carrier aggregation mode, or an intra-band polarization MIMO mode.

Aspect 15: The method of any of Aspects 13-14, wherein the information related to the multipath richness of the channel environment indicates a first number of clusters, paths, or multipath components that satisfy a first RSRP threshold in the first frequency band and a second number of clusters, paths, or multipath components that satisfy a second RSRP threshold in the second frequency band.

Aspect 16: The method of Aspect 15, wherein the first number of clusters, paths, or multipath components and the second number of clusters, paths, or multipath components are determined by the UE based at least in part on SSB beams or CSI-RS beams transmitted by the base station during a beam training process.

Aspect 17: The method of any of Aspects 13-16, wherein the information related to the antenna module capabilities associated with the UE indicates one or more of a number of the one or more antenna modules of the UE, an antenna configuration or type of one or more antenna elements included in the one or more antenna modules of the UE, an array size for the one or more antenna modules of the UE, or an array geometry or inter-antenna element spacings of the one or more antenna modules of the UE.

Aspect 18: The method of any of Aspects 13-17, further comprising: receiving, from the UE, a request to operate the one or more antenna modules in a preferred mode that is determined by the UE based at least in part on the information related to the multipath richness of the channel environment and the antenna module capabilities associated with the UE, wherein the MIMO mode is determined by the base station further based at least in part on the preferred mode requested by the UE.

Aspect 19: The method of Aspect 18, wherein the preferred mode requested by the UE is further based at least in part on the respective cell loadings in the first frequency band and the second frequency band.

Aspect 20: The method of Aspect 18, further comprising: broadcasting information indicating the respective cell loadings in the first frequency band and the second frequency band.

Aspect 21: The method of any of Aspects 18-20, further comprising: receiving, from the UE, information identifying the UE as a cell-edge UE based at least in part on the UE detecting clusters, paths, or multipath components excited by transmissions from multiple base stations or transmit receive points, wherein one or more of the preferred mode requested by the UE or the MIMO mode indicated by the base station is further based at least in part on whether the UE is identified as a cell-edge UE.

Aspect 22: The method of any of Aspects 13-21, wherein information enabling the base station to determine the MIMO mode in which to operate the one or more antenna modules is received in a CSF report transmitted by the UE.

Aspect 23: The method of any of Aspects 13-22, wherein information enabling the base station to determine the MIMO mode in which to operate the one or more antenna modules is received in UCI of a PUCCH transmitted by the UE.

Aspect 24: The method of any of Aspects 13-23, wherein one or more of information enabling the base station to determine the MIMO mode or the information indicating the MIMO mode is transmitted via RRC signaling.

Aspect 25: An apparatus for wireless communication at a device, comprising a processor; memory coupled with the processor; and instructions stored in the memory and executable by the processor to cause the apparatus to perform the method of any of Aspects 1-12.

Aspect 26: A device for wireless communication, comprising a memory and one or more processors coupled to the memory, the memory and the one or more processors configured to perform the method of any of Aspects 1-12.

Aspect 27: An apparatus for wireless communication, comprising at least one means for performing the method of any of Aspects 1-12.

Aspect 28: A non-transitory computer-readable medium storing code for wireless communication, the code comprising instructions executable by a processor to perform the method of any of Aspects 1-12.

Aspect 29: A non-transitory computer-readable medium storing a set of instructions for wireless communication, the set of instructions comprising one or more instructions that, when executed by one or more processors of a device, cause the device to perform the method of any of Aspects 1-12.

Aspect 30: An apparatus for wireless communication at a device, comprising a processor; memory coupled with the processor; and instructions stored in the memory and executable by the processor to cause the apparatus to perform the method of any of Aspects 13-24.

Aspect 31: A device for wireless communication, comprising a memory and one or more processors coupled to the memory, the memory and the one or more processors configured to perform the method of any of Aspects 13-24.

Aspect 32: An apparatus for wireless communication, comprising at least one means for performing the method of any of Aspects 13-24.

Aspect 33: A non-transitory computer-readable medium storing code for wireless communication, the code comprising instructions executable by a processor to perform the method of any of Aspects 13-24.

Aspect 34: A non-transitory computer-readable medium storing a set of instructions for wireless communication, the set of instructions comprising one or more instructions that, when executed by one or more processors of a device, cause the device to perform the method of any of Aspects 13-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting, to a network entity, information related to multipath richness of a channel environment and information indicating antenna module capabilities associated with the UE for at least a first frequency band and a second frequency band, wherein the first frequency band and the second frequency band are associated with a millimeter wave spectrum,
    wherein the information related to the multipath richness of the channel environment indicates a first number of beams that satisfy a first reference signal received power (RSRP) threshold in the first frequency band, and a second number of beams that satisfy a second RSRP threshold in the second frequency band; and
    receiving, from the network entity, information indicating a multiple input multiple output (MIMO) mode, associated with at least one of the first frequency band or the second frequency band, in which to operate one or more antenna modules of the UE based at least in part on the first number of beams and the second number of beams indicated by the information related to the multipath richness of the channel environment, the antenna module capabilities associated with the UE, and respective cell loadings in the first frequency band and the second frequency band.

2. The method of claim 1, wherein the MIMO mode is an intra-band spatial MIMO mode, an inter-band carrier aggregation mode, or an intra-band polarization MIMO mode.

3. The method of claim 1, wherein the first number of beams and the second number of beams are determined based at least in part on synchronization signal block beams or channel state information reference signal beams transmitted by the network entity during a beam training process.

4. The method of claim 1, wherein the information related to the antenna module capabilities associated with the UE indicates one or more of a number of the one or more antenna modules of the UE, an antenna configuration or type of one or more antenna elements included in the one or more antenna modules of the UE, an array size for the one or more antenna modules of the UE, or an array geometry or inter-antenna element spacings of the one or more antenna modules of the UE.

5. The method of claim 1, further comprising:
determining a preferred mode in which to operate the one or more antenna modules based at least in part on the first number of beams and the second number of beams indicated by the information related to the multipath richness of the channel environment and the antenna module capabilities associated with the UE; and
transmitting, to the network entity, a request to operate the one or more antenna modules in the preferred mode, wherein the MIMO mode indicated by the network entity is further based at least in part on the preferred mode requested by the UE.

6. The method of claim 5, wherein the preferred mode in which to operate the one or more antenna modules is further based at least in part on the respective cell loadings in the first frequency band and the second frequency band.

7. The method of claim 5, further comprising:
transmitting, to the network entity, information identifying the UE as a cell-edge UE based at least in part on detecting clusters, paths, or multipath components excited by transmissions from multiple network entities, wherein one or more of the preferred mode requested by the UE or the MIMO mode indicated by the network entity is further based at least in part on whether the UE is identified as a cell-edge UE.

8. The method of claim 1, wherein information enabling the network entity to determine the MIMO mode in which to operate the one or more antenna modules is transmitted in a channel state feedback report or uplink control information of a physical uplink control channel.

9. The method of claim 1, wherein one or more of information enabling the network entity to determine the MIMO mode or the information indicating the MIMO mode is transmitted via radio resource control signaling.

10. The method of claim 1, wherein a first MIMO mode is indicated based at least in part on the first number of beams satisfying a first beam number threshold, and a second MIMO mode is indicated based at least in part on the second number of beams satisfying a second beam number threshold.

11. A method of wireless communication performed by a network entity, comprising:
receiving, from a user equipment (UE), information related to multipath richness of a channel environment and information indicating antenna module capabilities associated with the UE for at least a first frequency band and a second frequency band, wherein the first frequency band and the second frequency band are associated with a millimeter wave spectrum,
wherein the information related to the multipath richness of the channel environment indicates a first number of beams that satisfy a first reference signal received power (RSRP) threshold in the first frequency band, and a second number of beams that satisfy a second RSRP threshold in the second frequency band; and
transmitting, to the UE, information indicating a multiple input multiple output (MIMO) mode, associated with at least one of the first frequency band or the second frequency band, in which to operate one or more antenna modules of the UE based at least in part on the first number of beams and the second number of beams indicated by the information related to the multipath richness of the channel environment, the antenna module capabilities associated with the UE, and respective cell loadings in the first frequency band and the second frequency band.

12. The method of claim 11, wherein the MIMO mode is an intra-band spatial MIMO mode, an inter-band carrier aggregation mode, or an intra-band polarization MIMO mode.

13. The method of claim 11, wherein the first number of beams and the second number of beams are determined by the UE based at least in part on synchronization signal block beams or channel state information reference signal beams transmitted by the network entity during a beam training process.

14. The method of claim 11, wherein the information related to the antenna module capabilities associated with the UE indicates one or more of a number of the one or more antenna modules of the UE, an antenna configuration or type of one or more antenna elements included in the one or more antenna modules of the UE, an array size for the one or more antenna modules of the UE, or an array geometry or inter-antenna element spacings of the one or more antenna modules of the UE.

15. The method of claim 11, further comprising:
receiving, from the UE, a request to operate the one or more antenna modules in a preferred mode that is determined by the UE based at least in part on the first number of beams and the second number of beams indicated by the information related to the multipath richness of the channel environment and the antenna module capabilities associated with the UE, wherein the MIMO mode is determined by the network entity further based at least in part on the preferred mode requested by the UE.

16. The method of claim 15, wherein the preferred mode requested by the UE is further based at least in part on the respective cell loadings in the first frequency band and the second frequency band.

17. The method of claim 15, further comprising:
receiving, from the UE, information identifying the UE as a cell-edge UE based at least in part on the UE detecting clusters, paths, or multipath components excited by transmissions from multiple network entities, wherein one or more of the preferred mode requested by the UE or the MIMO mode indicated by the network entity is further based at least in part on whether the UE is identified as a cell-edge UE.

18. The method of claim 11, wherein information enabling the network entity to determine the MIMO mode in which to operate the one or more antenna modules is received in a channel state feedback report transmitted by the UE or uplink control information of a physical uplink control channel transmitted by the UE.

19. The method of claim 11, wherein one or more of information enabling the network entity to determine the MIMO mode or the information indicating the MIMO mode is transmitted via radio resource control signaling.

20. The method of claim 11, wherein a first MIMO mode is indicated based at least in part on the first number of beams satisfying a first beam number threshold, and a second MIMO mode is indicated based at least in part on the second number of beams satisfying a second beam number threshold.

21. A user equipment (UE) for wireless communication, comprising:
a memory; and
one or more processors coupled to the memory, the one or more processors configured to cause the UE to:
transmit, to a network entity, information related to multipath richness of a channel environment and information indicating antenna module capabilities associated with the UE for at least a first frequency band and a second frequency band, wherein the first frequency band and the second frequency band are associated with a millimeter wave spectrum,
wherein the information related to the multipath richness of the channel environment indicates a first number of beams that satisfy a first reference signal received power (RSRP) threshold in the first frequency band, and a second number of beams that satisfy a second RSRP threshold in the second frequency band; and
receive, from the network entity, information indicating a multiple input multiple output (MIMO) mode, associated with at least one of the first frequency band or the second frequency band, in which to operate one or more antenna modules of the UE based at least in part on the first number of beams and the second number of beams indicated by the information related to the multipath richness of the channel environment, the antenna module capabilities associated with the UE, and respective cell loadings in the first frequency band and the second frequency band.

22. The UE of claim 21, wherein the MIMO mode is an intra-band spatial MIMO mode, an inter-band carrier aggregation mode, or an intra-band polarization MIMO mode.

23. The UE of claim 21, wherein the memory and the one or more processors are further configured to:
determine a preferred mode in which to operate the one or more antenna modules based at least in part on the first number of beams and the second number of beams indicated by the information related to the multipath richness of the channel environment and the antenna module capabilities associated with the UE; and
transmit, to the network entity, a request to operate the one or more antenna modules in the preferred mode, wherein the MIMO mode indicated by the network entity is further based at least in part on the preferred mode requested by the UE.

24. The UE of claim 23, wherein the preferred mode in which to operate the one or more antenna modules is further based at least in part on the respective cell loadings in the first frequency band and the second frequency band.

25. The UE of claim 23, wherein the memory and the one or more processors are further configured to:
transmit, to the network entity, information identifying the UE as a cell-edge UE based at least in part on detecting clusters, paths, or multipath components excited by transmissions from multiple network entities, wherein one or more of the preferred mode requested by the UE or the MIMO mode indicated by the network entity is further based at least in part on whether the UE is identified as a cell-edge UE.

26. A network entity for wireless communication, comprising:
a memory; and
one or more processors coupled to the memory, the one or more processors configured to cause the network entity to:
receive, from a user equipment (UE), information related to multipath richness of a channel environment and information indicating antenna module capabilities associated with the UE for at least a first frequency band and a second frequency band, wherein the first frequency band and the second frequency band are associated with a millimeter wave spectrum,
wherein the information related to the multipath richness of the channel environment indicates a first number of beams that satisfy a first reference signal received power (RSRP) threshold in the first frequency band, and a second number of beams that satisfy a second RSRP threshold in the second frequency band; and
transmit, to the UE, information indicating a multiple input multiple output (MIMO) mode, associated with at least one of the first frequency band or the second frequency band, in which to operate one or more antenna modules of the UE based at least in part on the first number of beams and the second number of beams indicated by the information related to the multipath richness of the channel environment, the antenna module capabilities associated with the UE, and respective cell loadings in the first frequency band and the second frequency band.

27. The network entity of claim 26, wherein the MIMO mode is an intra-band spatial MIMO mode, an inter-band carrier aggregation mode, or an intra-band polarization MIMO mode.

28. The network entity of claim 26, wherein the memory and the one or more processors are further configured to:
receive, from the UE, a request to operate the one or more antenna modules in a preferred mode that is determined by the UE based at least in part on the first number of beams and the second number of beams indicated by the information related to the multipath richness of the channel environment and the antenna module capabilities associated with the UE, wherein the MIMO mode is determined by the network entity further based at least in part on the preferred mode requested by the UE.

29. The network entity of claim 28, wherein the preferred mode requested by the UE is further based at least in part on the respective cell loadings in the first frequency band and the second frequency band.

30. The network entity of claim 28, wherein the memory and the one or more processors are further configured to:
receive, from the UE, information identifying the UE as a cell-edge UE based at least in part on the UE detecting clusters, paths, or multipath components excited by transmissions from multiple network entities, wherein one or more of the preferred mode requested by the UE or the MIMO mode indicated by the network entity is further based at least in part on whether the UE is identified as a cell-edge UE.

* * * * *